(12) United States Patent
Wheeler

(10) Patent No.: US 12,165,124 B2
(45) Date of Patent: Dec. 10, 2024

(54) PROXIMITY BASED INTERACTIONS VIA MOBILE DEVICES

(71) Applicant: CITIBANK, N.A., New York, NY (US)

(72) Inventor: Therman Wheeler, Flower Mound, TX (US)

(73) Assignee: Citibank, N.A., New York, NY (US)

( * ) Notice: Subject to any disclaimer, the term of this patent is extended or adjusted under 35 U.S.C. 154(b) by 636 days.

(21) Appl. No.: 16/014,899

(22) Filed: Jun. 21, 2018

(65) Prior Publication Data

US 2018/0374076 A1 Dec. 27, 2018

Related U.S. Application Data

(60) Provisional application No. 62/523,024, filed on Jun. 21, 2017.

(51) Int. Cl.
| | |
|---|---|
| *G06Q 20/32* | (2012.01) |
| *G06Q 20/20* | (2012.01) |
| *G06Q 20/22* | (2012.01) |
| *G06Q 20/40* | (2012.01) |
| *G06Q 30/0601* | (2023.01) |

(52) U.S. Cl.
CPC ......... *G06Q 20/3224* (2013.01); *G06Q 20/20* (2013.01); *G06Q 20/22* (2013.01); *G06Q 20/325* (2013.01); *G06Q 20/3278* (2013.01); *G06Q 20/40145* (2013.01); *G06Q 30/0633* (2013.01)

(58) Field of Classification Search
CPC .... G06Q 20/3224; G06Q 20/20; G06Q 20/22; G06Q 20/325; G06Q 20/3278; G06Q 20/40145; G06Q 30/0633; G06Q 40/00; G06Q 40/025; G06Q 40/12
USPC .................................................. 705/35, 44
See application file for complete search history.

(56) References Cited

U.S. PATENT DOCUMENTS

| | | | | |
|---|---|---|---|---|
| 9,264,850 | B1 * | 2/2016 | Lee ...................... | H04W 4/023 |
| 9,373,112 | B1 * | 6/2016 | Henderson ............ | G06Q 20/40 |
| 9,613,381 | B2 * | 4/2017 | Parento ................. | G06Q 20/10 |
| 9,704,172 | B2 * | 7/2017 | Murray ................. | G06F 3/0482 |
| 10,373,383 | B1 * | 8/2019 | Werner .................. | G06F 3/167 |
| 10,614,445 | B1 * | 4/2020 | Dorsey .................. | G06Q 20/10 |
| 2012/0240195 | A1 * | 9/2012 | Weiss .................. | H04L 63/0846 |
| | | | | 726/4 |

(Continued)

*Primary Examiner* — Paul S Schwarzenberg
*Assistant Examiner* — Mark A Malkowski
(74) *Attorney, Agent, or Firm* — Perkins Coie LLP

(57) ABSTRACT

Techniques are provided for performing automated operations to identify one or more computing devices associated with potential payees that are within a defined proximity of a user mobile device. Potential payees may include individuals and merchant point-of-sale computing systems. A processor-based computing system retrieves stored photographic and biographic information regarding the identified potential payees, and displays the retrieved photographic and biographic information for possible selection by a user of the mobile device. One or more payments from the user of the mobile device may be specified and initiated via the processor-based computing system to potential payees selected by the user, including for partial or full payment of a customer order of the user with a merchant associated with an identified point-of-sale computing system.

11 Claims, 7 Drawing Sheets

(56) References Cited

U.S. PATENT DOCUMENTS

| | | | |
|---|---|---|---|
| 2013/0132274 A1* | 5/2013 | Henderson | G06Q 20/4014 705/41 |
| 2013/0218721 A1* | 8/2013 | Borhan | G06Q 20/322 705/26.41 |
| 2015/0371210 A1* | 12/2015 | Chatterjee | G06Q 20/327 705/21 |
| 2016/0071110 A1* | 3/2016 | Lazay | G06Q 20/10 705/44 |
| 2016/0125369 A1* | 5/2016 | Grassadonia | G06Q 20/384 705/44 |
| 2016/0379201 A1* | 12/2016 | Sabet | G06Q 20/322 705/39 |
| 2018/0165675 A1* | 6/2018 | Isaacson | G06Q 20/24 |

* cited by examiner

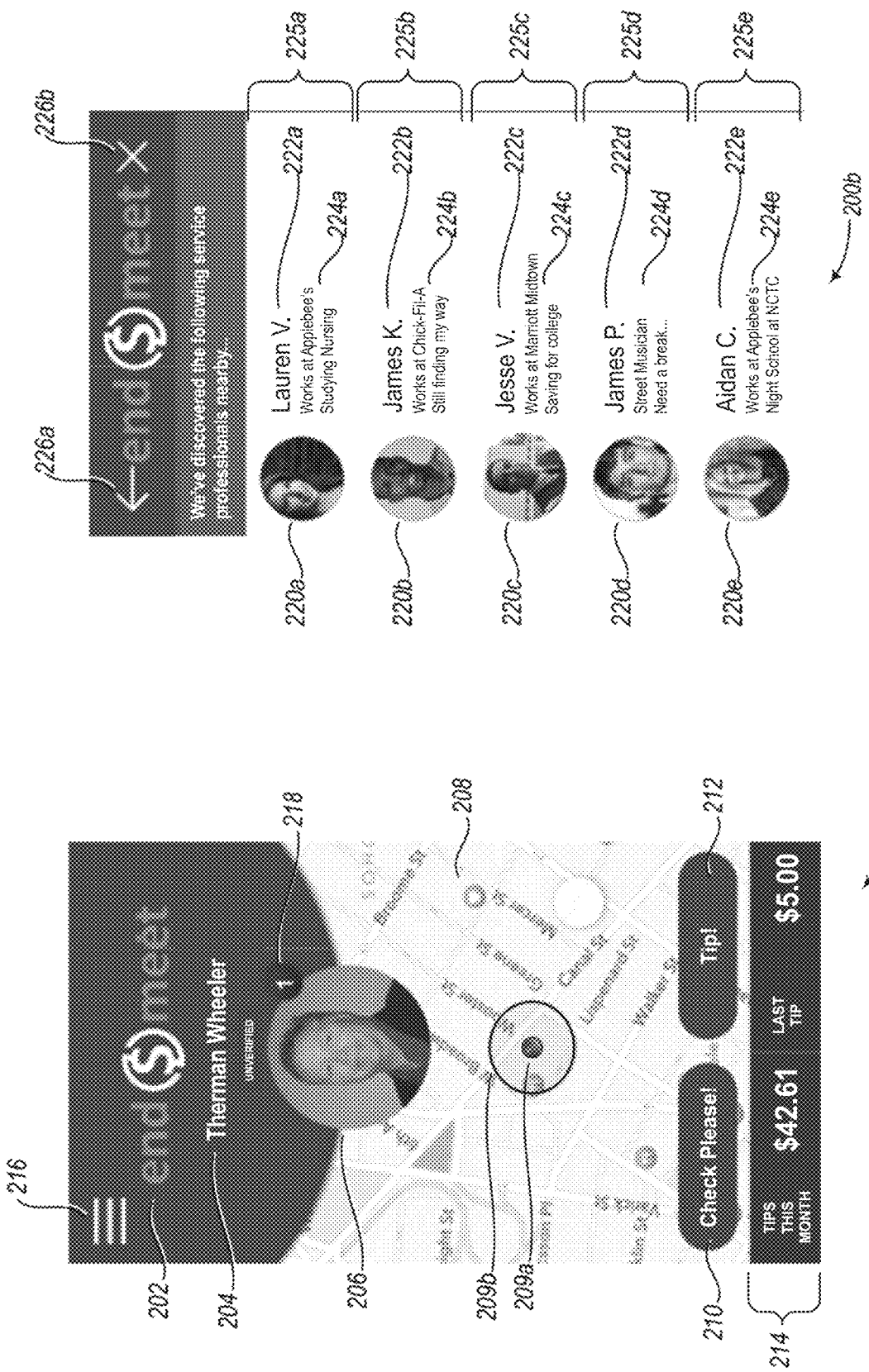

PROXIMITY BASED INTERACTIONS VIA MOBILE DEVICES

CROSS REFERENCE TO RELATED APPLICATIONS

This application claims the benefit of priority to U.S. Provisional Patent Application No. 62/523,024, filed Jun. 21, 2017. The content of the foregoing application is incorporated herein in its entirety by reference.

TECHNICAL FIELD

The following disclosure relates generally to techniques for facilitating mobile interactions between identified users located within a geographic proximity.

BACKGROUND

Historically, payment of gratuities has typically involved monetary currency cash. A street musician or other busker places a hat on a street corner, and appreciative listeners deposit coins or paper bills within the hat; a diner within a restaurant leaves a small collection of cash on the table as they exit after a meal; etc. While the payment of certain cash-based gratuities still occurs, in modern industrialized societies the role of cash has been deprecated to the extent that many individuals do not possess or carry much (or any) monetary currency in ordinary circumstances. In limited scenarios and with respect to certain transactions, gratuities may be paid using some mechanism other than cash (e.g., a credit card), such as via a specific line item when paying a larger customer bill from a restaurant or other merchant. However, many scenarios in which gratuities are desirable are unrelated to such transactions, and may therefore simply be omitted or overlooked for lack of readily available monetary currency. Furthermore, particular individuals may avoid paying gratuities even when cash is available to do so, such as if they feel that "tipping" is somehow awkward or undesirably patronizing.

Furthermore, particular disadvantages arise even in those circumstances for which gratuities may be paid using a mechanism other than cash. For example, there may be a lengthy delay between ordering or finishing a meal and receiving the bill, in which case the service provided by the waiter or waitress may be retroactively viewed unfavorably by the diner even if such service was otherwise exemplary.

Thus, there is a need for new techniques to allow the payment of gratuities, merchant orders, donations, or other payments using instruments or devices readily available in a modernized society, such as a "smart phone" or other mobile computing device.

BRIEF SUMMARY

Techniques are provided herein for processor-based computing systems to perform automated operations for identifying one or more computing devices associated with potential payees (including individuals and merchant point-of-sale computing systems, that are within a defined proximity of a user mobile device. A processor-based computing system retrieves stored photographic and/or biographic information regarding the identified potential payees, and displays the retrieved photographic and/or biographic information for possible selection by a user of the mobile device. One or more payments from the user of the mobile device may be specified and initiated via the processor-based computing system to potential payees selected by the user, including for partial or full payment of a customer order of the user with a merchant associated with an identified point-of-sale computing system.

A computer-implemented method may be summarized as including identifying each of a number of mobile devices in a proximity of a first mobile device that is logically associated with a potential payor; for each of at least some of the identified mobile devices in the proximity of the first mobile device that is logically associated with the potential payor, causing a presentation of a photographic representation of a respective potential payee that is logically associated with the respective identified mobile device, the presentation via a display of the mobile device that is logically associated with the potential payee; and in response to an input received via a user interface of the first mobile device, causing a crediting of an account associated with a selected one of the potential payees. Causing the crediting of the account associated with the selected one potential payee may include causing a crediting of multiple accounts associated with the selected one potential payee in accordance with defined preferences of the selected one potential payee.

The computer-implemented method may further include receiving information from the potential payor specifying a payment amount for the crediting of the account associated with the selected one potential payee.

Causing the crediting of the account associated with the selected one potential payee may include causing a corresponding debiting of an account associated with the potential payor.

The computer-implemented method may further include identifying a point-of-sale terminal associated with a merchant that is within the proximity of the first mobile device, and providing an indication to the potential payor via the first mobile device of an order of the potential payor that is associated with the merchant, wherein causing a crediting of an account associated with the selected one of the potential payees includes causing a crediting of an account associated with the merchant for at least a portion of the associated order. Causing the presentation of the photographic representation of the respective potential payee logically associated with one of the identified mobile devices may include causing the one identified mobile device to further display biographic information associated with the respective potential payee. The biographic information associated with the respective potential payee may have been supplied by the respective potential payee. The respective potential payee logically associated with one of the identified mobile devices may be a service provider associated with one or more services for the potential payor.

A non-transitory computer-readable medium having stored contents that, when executed, cause one or more processors of one or more configured computing devices to perform a method, may be summarized as including receiving, by the one or more processors, an indication that a mobile device of a user is within a defined proximity of one or more identified potential payees; determining, by the one or more processors and based at least in part on information associated with the user and with the one or more identified potential payees, at least one appropriate potential payee of the identified potential payees to which payment may be provided by the user; providing to the user, by the one or more processors and based at least in part on the determining of the at least one appropriate potential payee, one or more payment options for providing payment from the user to the at least one appropriate potential payee, each of the one or more provided payment options including a display to the user of a respective image associated with each of the at least one appropriate potential payees; and initiating, by the one or more processors and responsive to a selection by the user of at least one of the one or more provided payment options, payment from the user to one or more selected payees of the at least one appropriate potential payees.

The one or more identified potential payees may include a point-of-sale terminal associated with a merchant, providing one or more payment options to the user may further include providing an indication of an order associated with the user, and initiating the payment from the user may include initiating payment to the point-of-sale terminal for at least a portion of the associated order. Providing the indication of the order associated with the user may include providing an itemized listing of charges included in the order.

The one or more identified potential payees may further include a service provider associated with the merchant, and the providing of the indication of the associated order may be based at least in part on an identification of the user by the associated service provider. The providing of the indication of the associated order may be based at least in part on information transmitted between the mobile device of the user and a wireless receiver communicatively coupled to the point-of-sale terminal. The information transmitted between the mobile device and the wireless receiver may be transmitted via one of a group that may include a Wi-Fi connection, a Bluetooth connection, and a near-field communication (NFC) connection. The indicated order may be further associated with one or more additional parties, and providing the one or more payment options to the user may include providing an indication of one or more potential payors that include the one or more additional parties.

The method may further include receiving a selection from the user of at least one of the one or more additional parties and, responsive to the selection of the at least one additional parties, initiating a request for a partial payment of the indicated order from each of the selected at least one additional parties.

The method may further include receiving an indication from the user that at least one of the one or more additional parties are not included in the indicated one or more potential payors and, responsive to the indication from the user, causing the mobile device to display user interface elements to enable the at least one additional party to register as a potential payor. The user interface elements may include one or more of a group that may include a computer-readable code, a web address, and an input field. The one or more identified potential payees may include a point-of-sale (POS) terminal associated with a merchant, one or more other of the identified potential payees may also be associated with the merchant, and providing the one or more payment options to the user may include providing at least one payment option that includes initiating a payment to each of both the point-of-sale terminal and at least one of the other identified potential payees. The user associated with the mobile device may be a first user having a first type, one or more of the identified potential payees may be users having a distinct second type, and determining the at least one appropriate potential payee may include determining, based at least in part on the first user being of the first type, that the one or more users of the distinct second type are appropriate potential payees with respect to the first user. The initiating of the payment from the user to the one or more selected payees may include initiating a notification to each of the one or more selected payees of the initiated payment. Receiving the indication that the mobile device is within the defined proximity may be based at least in part on the mobile device entering a defined geographic area associated with at least one of the one or more identified potential payees.

Providing the one or more payment options to the user may further include providing biographical information regarding the at least one of the appropriate potential payees. Initiating payment from the user to the one or more selected payees may include initiating a third-party payment service via the mobile device of the user. The one or more processors may be housed within the mobile device of the user, and at least some of the method may be performed via an application that is associated with a payment service executing on the mobile device. The method may be performed by one or more remote servers that may include the one or more processors.

A system may be summarized as including one or more hardware processors; one or more memories storing software instructions that, when executed by at least one of the one or more hardware processors, perform a method, the method including: receiving an indication that a mobile device of a user is within a defined proximity of one or more identified potential payees; determining, based at least in part on information associated with the user and with the one or more identified potential payees, at least one appropriate potential payee of the identified potential payees to which payment may be provided by the user; providing to the user, based at least in part on the determining of the at least one appropriate potential payee, one or more payment options for providing payment from the user to the at least one appropriate potential payee, each of the one or more provided payment options including a display to the user of a respective image associated with each of the at least one appropriate potential payees; and responsive to a selection by the user of at least one of the one or more provided payment options, initiating payment from the user to one or more selected payees of the at least one appropriate potential payees.

A computer-implemented method may be summarized as, via a set of instructions executing on a first mobile device, identifying a second mobile device of a potential payee; generating, via the set of instructions, payment information regarding a payment to the potential payee; providing the payment information, over a network, to a server; receiving, from the server over the network, reference information useable to identify the payment at a time in the future; and providing, to the second mobile device over an ad hoc network connection, the reference information.

A further computer-implemented method may be summarized as, at a mobile device, receiving one or more communications, over an ad hoc connection to a second mobile device, including reference information useable to execute a transfer of funds initiated on the second mobile device and a uniform resource identifier; obtaining, via a network, a set of instructions using the uniform resource identifier; and transmitting, via the set of instructions, a request to execute the transfer of funds, the request including the reference information.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn, are not intended to convey any information regarding the actual shape of the particular elements, and have been solely selected for ease of recognition in the drawings.

FIGS. 2A-F are sequential screen shots illustrating examples of providing a Mobile Payment Facilitation system via various graphical user interfaces displayed on an exemplary computing system of an individual user in accordance with an embodiment of the present disclosure.

DETAILED DESCRIPTION

Figure 1:
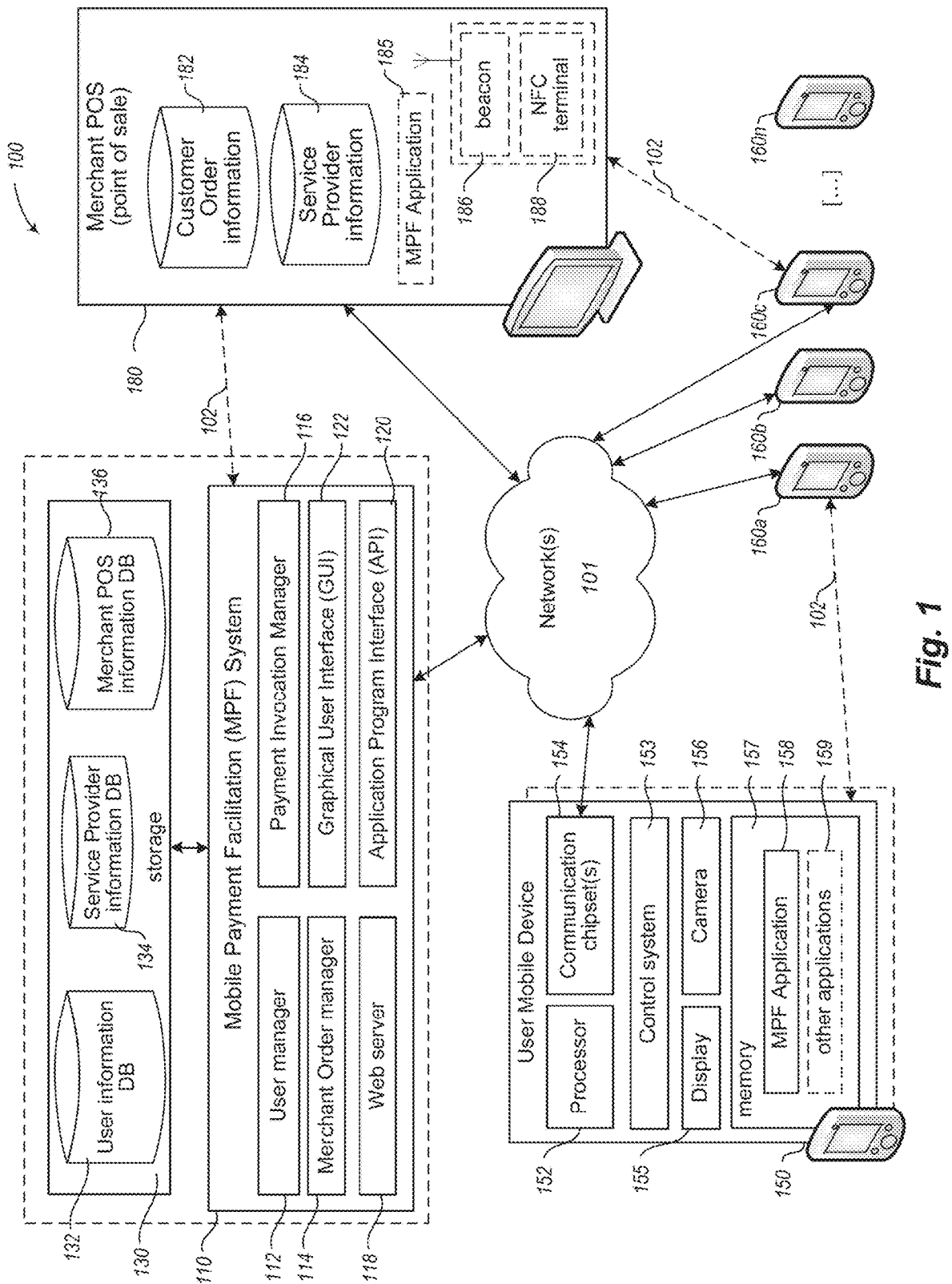
FIG. 1 is a schematic diagram depicting a networked environment that includes a plurality of computing systems in accordance with an embodiment of the present disclosure.

The present disclosure relates generally to techniques for one or more processor-based computing systems to identify one or more computing devices associated with potential payees that are within a defined proximity of a user mobile device. The present disclosure further relates to techniques for one or more processor-based computing systems to retrieve photographic and biographic information regarding the identified potential payees; to display retrieved photographic and biographic information regarding such potential payees for possible selection by a user of the mobile device; and to initiate one or more payments from the user of the mobile device to potential payees selected by the user. Some or all of the techniques described herein may be performed locally or remotely via automated operations of an embodiment of a Mobile Payment Facilitation ("MPF") system, as discussed in greater detail below.

As an example scenario, assume that a user Helen of a mobile device is out for an evening of dining and entertainment. Exiting her vehicle, Helen executes an embodiment of an MPF application on her mobile device, which displays a user selectable photographic representation and possibly additional information regarding the valet now parking her car. She selects the valet's displayed user selectable photographic representation, enters "$5.00" in a text box provided by the MPF application, and selects a graphical control of the application to initiate payment of the specified gratuity to the valet directly. The valet receives a notification on his own mobile device indicating that a gratuity of $5 has been credited to his checking account, and displaying a photographic representation of Helen.

Proceeding towards the restaurant, Helen passes a pair of musicians, one with a guitar and the other singing beautifully. As she is listening, she receives a notification from the MPF application on her mobile device that one or more potential payees have been identified in her immediate area. She taps on the notification and is presented with a listing of nearby potential payees that includes a photographic representation of each of the two musicians, along with brief biographical information indicating that they are students at a local university and that 20% of all money received by the musicians via the MPF application is designated towards tuition. She selects the entries presented for both student musicians, enters a tip amount, and selects the provided control in order for the MPF application to transfer that amount to each student. In some implementations, the presented photographic representations may be user selectable. Alternatively or additionally, other user selectable information (e.g., name, nickname, biographical information) or user selectable icon may be presented along with the photographic representation.

At the restaurant, Helen joins two friends and is seated at a table near the window. They enjoy the meal immensely, and the waiter is both attentive and quick. Helen again consults the MPF application executing on her mobile device, and is presented with a listing of nearby potential payees that includes a photographic representation of one of her two friends, as well as a photographic representation of her waiter and an indication that he works at the restaurant. Upon Helen selecting the waiter's entry by tapping on his photographic representation, the MPF application displays an itemized listing of the table's order. By selecting a control element inviting her to split the bill, the MPF application again displays a listing of nearby potential payees, but which now excludes those identified as service providers associated with the restaurant itself. Helen selects the entry corresponding to her friend Brian, and further indicates to the MPF application that one or more other parties associated with the table's order are not listed. In response, the MPF application displays two-dimensional machine-readable symbol (e.g., QR Code symbol). Helen's friend Sam, who has never interacted with the MPF system before, scans the machine-readable symbol with a camera of her own mobile device, which then displays a registration screen for the MPF system.

In a few moments, the listing of proximate potential payees on Helen's mobile device is updated by the MPF system to include new user Sam. Helen then selects the entries displayed corresponding to her two friends Brian and Sam, indicates a percentage tip to include for the waiter, and selects the control presented by the MPF application to initiate payments from each of the three friends in order to split the bill. Brian and Sam each affirm the payment via a notification presented by the MPF system on their own respective mobile devices. The MPF system initiates a first payment to the restaurant's point-of-sale terminal for the itemized order and a second payment to an account of the waiter according to the percentage tip specified by Helen. The waiter and restaurant point-of-sale terminal each receive a notification that the table's order has been paid, and Helen, Brian and Sam exit the restaurant without waiting for a receipt, which has already been sent to their respective electronic addresses by the MPF system.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with particular computing systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

As used herein (i.e., in this specification and the appended claims), the singular forms "a," "an," and "the" include plural referents unless the content clearly dictates otherwise. It should also be noted that the term "or" is generally employed in its broadest sense, that is, as meaning "and/or" unless the content clearly dictates otherwise.

As used herein, a "transaction" may include any commercial transaction, financial transaction, legal transaction, or other transaction. A "customer" may include any individual or entity capable of initiating a commercial, financial, legal, or other transaction. A "payee" or "potential payee" may include any individual or entity capable of receiving a gratuity or other payment via any commercial, financial, legal, or other transaction, either in exchange for consideration (such as service rendered) or without consideration (such as a donation). A "user" may include individual users of a computing system or any other entity interacting with a computing system on behalf of an individual user, including past, future or current users, and may also be used a payee or potential payee associated with a computing system or other device that is interacting or has interacted with an embodiment of an MPF system. Reference herein to a "user" or "payee" without further designation may include a single person, or in some situations a group of affiliated persons, and may, depending on the context in which the term is used, refer to single or multiple entities. The terms "payor" and "payer" are used interchangeably, and may include any individual or entity capable of making or initiating a gratuity or other payment via any commercial, financial, legal, or other transaction, for example either in exchange for consideration (such as service rendered) or without consideration (such as a donation).

Also as used herein, the term "merchant" may include any entity with which a user or other customer is engaged or may engage in a transaction. For example, a merchant may be regularly or irregularly engaged in the sale or other transfer of products or services in exchange for a monetary payment or other remuneration; a charitable, political, or other organization engaged in solicitation of monetary payment or other remuneration on behalf of the organization or other parties; etc. Reference herein to a "merchant" without further designation may include a single entity or multiple entities. Use of the term "service provider" herein indicates a potential payee that is associated with a merchant, such as an employee, agent, or other representative. Typical but non-limiting examples of such service providers may include service personnel at bars and restaurants; hotel staff; valets; etc. A merchant "point-of-sale," "point-of-sale terminal," and "point-of-sale computing system" may be used interchangeably herein, and refers to any computing system or other device capable of accepting and/or facilitating payment on behalf of a merchant associated with the computing system or other device.

The term "selecting," when used herein in relation to one or more elements of a graphical user interface or other electronic display, may include various user actions taken with respect to various input control devices depending on the computing device used to interact with the display, such as one or more tapping interactions using a touch screen of a mobile device, one or more clicks using a mouse or other pointing device, etc. In addition, such selecting may additionally comprise interactions with various physical actuators capable of generating electrical or electronic signal as a result of such interactions.

FIG. 1 depicts a schematic diagram of an exemplary networked environment 100 and a plurality of computing systems in accordance with an embodiment of the present disclosure. In particular, FIG. 1 includes an embodiment of a Mobile Payment Facilitation ("MPF") system 110, one or more user mobile devices 150, multiple potential payee mobile devices 160a-n, and a merchant point-of-sale computing system ("terminal") 180. The user mobile device, potential payee mobile devices, and merchant point-of-sale terminal are each communicatively coupled to the MPF system 110 via one or more intervening network(s) 101. In addition, some or all of such devices may be communicatively coupled to one another via additional communication links to facilitate inter-device communications and other functionality described herein, such as via direct wireless connections 102, and may link directly to one or more additional devices or computer networks using any appropriate high-speed data mobile wireless communication methods, components and/or protocols. Some or all of the user mobile device, potential payee devices, and merchant point-of-sale terminal may also respectively include GPS functionality (such as, with respect to the user mobile device, communication chipsets 154) for determining a geographical location of the respective device.

In the depicted embodiment, the MPF system 110 includes a user manager 112, a merchant order manager 114, a payment invocation manager 116, a Web server 118, an Application Program Interface ("API") 120 and a Graphical User Interface ("GUI") 122. The MPF system is communicatively coupled (locally or remotely) to storage facility 130, which includes user information database 132, service provider information database 134, and merchant point-of-sale information database 136. In certain implementations, the storage facility 130 may be incorporated within or otherwise directly operated by the MPF system; in other implementations, some or all of the functionality provided by the storage facility may be provided by one or more third-party network-accessible storage service providers.

In the depicted embodiment, the user mobile device 150 includes one or more hardware processors 152; one or more communication chipsets 154 (e.g., Bluetooth chipset, "Bluetooth low energy" or "BLE" chipset, GPS chipset, one or more cellular network chipsets, one or more Wi-Fi or other wireless network communication chipsets, etc.); a camera 156; a display system 155, which includes a main display screen having a plurality of graphical display elements, and may further include other components of the mobile device (such as one or more light-emitting elements aside from the main display screen); and a control system 153. In at least some embodiments, the display system 155 may include a touchscreen component of the control system 153, such that at least some operations of the mobile device may be controlled by physical user interaction with elements of a graphical user interface presented via the display system. The mobile device as depicted further includes a memory 157, in which is executing a MPF application 158, and in which may optionally be executing one or more other components or applications 159 (e.g., a web browser).

In the depicted embodiment, the merchant point-of-sale computing system 180 includes a customer order information database 182 and a service provider information database 184, such as to track and maintain various information respectively regarding customers and service providers associated with the merchant. In various embodiments, the merchant point-of-sale computing system may be executing a client MPF application 185, and may include or be communicatively coupled to one or more proximity beacons 186 and an NFC terminal 188, such as to facilitate identification of (and communication with) service provider devices and user devices within a defined geographic proximity to the merchant point-of-sale computing system. In certain embodiments, for example, such proximity beacons and/or NFC terminal may include various communication chipsets (GPS, BLE, etc.) in a manner similar to that described with respect to the user mobile device 150, as well as one or more communications interfaces. The merchant point-of-sale computing system 180 may be fixed or mobile, and may include instances of various computing devices such as, without limitation, desktop or other computers (e.g., tablets, slates, etc.), database servers, network storage devices and other network devices, smart phones and other cell phones, consumer electronics, digital music player devices, handheld gaming devices, PDAs, pagers, electronic organizers, Internet appliances, and various other consumer products that include appropriate communication capabilities.

Also in the depicted embodiment of FIG. 1, an arbitrary number of potential payee mobile devices 160 are included in the networked environment 100, some or all of which may be located within a defined geographic proximity to the user mobile device 150. Various of the potential payee mobile devices are communicatively coupled in various ways to one or more of network(s) 101, the user mobile device, and the merchant point-of-sale computing system 180. For example, potential payee mobile device 160a is communicatively coupled to network(s) 101 via a Wi-Fi or cellular connection, and in addition is communicatively coupled to the user mobile device 150 via a direct wireless connection 102 (such as via a Bluetooth or other peer-to-peer connection); potential payee mobile device 160b is communicatively coupled to network(s) 101 via a Wi-Fi or cellular connection, and may further be communicatively coupled to user mobile device 150 and/or merchant point-of-sale computing system 180 indirectly via the network(s) 101; potential payee mobile device 160c is communicatively coupled to network(s) 101 via a Wi-Fi or cellular connection, is further communicatively coupled to the merchant point-of-sale computing system via another direct wireless connection 102, and may still further be communicatively coupled to the user mobile device indirectly via the network(s) 101; etc. While not explicitly depicted in the illustration of FIG. 1, some or all of the potential payee mobile devices 160 and merchant point-of-sale computing system 180 may include some or all of the types of components illustrated for user mobile device 150. As a non-limiting example, while not explicitly depicted within the networked environment of FIG. 1, each of potential payee mobile devices 160a-n may also be executing a client MPF application, browser, and/or other applications in memory, such as to perform various interactions with the MPF system 110, user mobile device 150, merchant point-of-sale computing system 180, or others.

Interactions of the MPF system 110 with the user mobile device 150, potential payee mobile devices 160, and merchant point-of-sale computing system 180 may occur in various ways, such as in an interactive manner via a graphical user interface 122 that is provided to users by the MPF system via at least some Web pages of a MPF system Web site. Information and interactions provided via the Web site may also be provided in a programmatic manner via one or more client software applications via the Application Program Interface ("API") 120 provided by the MPF system, which allows computing systems and/or programs to invoke such functionality programmatically, such as using Web services or other network communication protocols. In the illustrated embodiment, various interactions between the MPF system and the user mobile device, potential payee mobile devices, and merchant point-of-sale computing system may be performed using a web browser (not shown) or client MPF application, each of which may respectively be executing on the associated computing system or client device.

In the depicted networked environment 100 of FIG. 1, the network(s) 101 is a publicly accessible network of linked networks, possibly operated by various distinct parties, such as the Internet. In other implementations, the network(s) 101 may have other forms. For example, the network(s) 101 may instead be a private network, such as a corporate or university network that is wholly or partially inaccessible to non-privileged users. In still other implementations, the network(s) 101 may include both private and public networks, with one or more of the private networks having access to and/or from one or more of the public networks. Furthermore, the network(s) 101 may include various types of wired and/or wireless networks in various situations. In addition, in this illustrated example of FIG. 1, users may utilize client computing systems and/or other client devices to interact with the MPF system 110 to obtain various described functionality via the network(s) 101, and in doing so may provide various types of information to the MPF system 110. Moreover, in certain implementations, the various users and providers of the networked environment 100 may interact with the MPF system and/or one or more other users and providers using an optional private or dedicated connection, such as one of the private and/or direct wireless connections 102.

In certain implementations, an embodiment of an MPF system may, while interacting with and/or executing on a mobile user device located at an arbitrary location, identify one or more additional computing systems within a defined geographical proximity of the mobile user device. For example, the MPF system may identify mobile computing systems or other devices associated with other users of the MPF system, as well as one or more point-of-sale computing systems that are associated with one or more merchants and located within the defined geographical proximity. In certain embodiments, identification of a potential payee may be based on user information previously stored by the MPF system and associated with the potential payee, such as if the potential payee is also a registered user of the MPF system. In other scenarios, a potential payee device may be identified by the MPF system even if the user of that device has not previously registered with the MPF system; in order to receive payment from a user mobile device via the MPF system, the MPF system may transmit or otherwise display information to the potential payee (such as the computer-readable two-dimensional barcode from the example described above) prompting the potential payee to register as an MPF system user.

In certain scenarios and embodiments, identification of a potential payee may occur via one or more interactions with an embodiment of a remote MPF system such as MPF system 110 (with continuing reference to FIG. 1), such as based on a respective geographical location of the user and potential payee as reported by a GPS chipset within each of the user mobile device 150 and potential payee mobile device 160*b*. As another example, identification of a potential payee may be based on a communication channel established between the user mobile device and potential payee mobile device, such as a Bluetooth connection via the direct wireless connection 102 depicted between the user mobile device and potential payee mobile device 160*a*. As another example, an identification of a potential payee mobile device 160*c* may be based on a detection by the MPF system executing on user mobile device 150 of the proximity beacon 186 connected to point-of-sale computing system 180, on the direct wireless connection 102 depicted between potential payee mobile device 160*c* and the merchant point-of-sale computing system, or both.

In certain scenarios and embodiments, potential payees that are within a defined proximity of the user mobile device may be identified in an autonomous manner by the MPF system, such that one or more notifications regarding the identified potential payees may be provided to a user of the mobile device. In other scenarios, the MPF system may perform an identification of proximate potential payees only upon receiving a request from the user (such as via a selection of one or more graphical user interface elements provided by the MPF system), or may perform such identification autonomously but without providing a notification or display to the user regarding identified proximate potential payees until such a user request is received.

In at least one embodiment, the MPF system may retrieve information regarding each identified potential payee, such as by MPF system 110 retrieving such information from storage 130. In at least some scenarios, the information regarding each identified potential payee may include a photographic representation of the potential payee (such as for selection by the user); biographical information (such as may have been provided by the potential payee or in some other manner); information regarding one or more merchants associated with the potential payee (e.g., an employer or contractor of the potential payee); information regarding one or more user preferences of the potential payee (such as how gratuities credited to the potential payee may be divided among distinct accounts or for disparate purposes); and other information.

In at least some embodiments, the MPF system may determine to limit a display of identified proximate potential payees to those determined by the MPF system to be appropriate payees for the user, such as based on one or more defined user preferences, on the tracked behavior of the user or potential payees, on historical information regarding payments previously provided by the user via the MPF system, or in another manner. For example, the MPF system may determine to limit appropriate potential payees to registered users of the MPF system; to users of the MPF system that have previously received gratuities via the MPF system within a defined time period; to service providers associated with one or more identified merchants; to potential payees not associated with one or more identified merchants; etc. With reference to the non-limiting example of Helen's evening out provided above, the MPF system determined, when presenting a listing of identified proximate potential payees for purposes of sharing responsibility for the customer order, to entirely exclude those potential payees associated with the restaurant. Thus, in certain scenarios and embodiments, the MPF system may therefore omit from such listing those potential payees determined not to be appropriate, and/or may initiate or modify a listing of potential payees based on such determination, such as to list the merchant-associated service providers ahead of other potential payees within such a listing or otherwise differentiate the merchant-associated service providers from other potential payees; etc.

In certain scenarios and embodiments, the MPF system may determine to perform one or more interactions with an identified merchant point-of-sale terminal and/or other computing systems to retrieve information regarding a customer order of the user with the identified merchant, such as to retrieve and display an itemized listing of items within the customer order. For example, the MPF system may initiate such interactions with the identified merchant point-of-sale terminal in response to a selection by the user of the point-of-sale terminal, of a service provider associated with the relevant merchant, or on some other basis (e.g., upon detection of proximity beacon 186, or upon other identification of the point-of-sale terminal). In certain embodiments and scenarios, before retrieving the information regarding the customer order, the MPF system may request confirmation that the user is associated with the customer order, such as by presenting a notification to the service provider selected by the user that includes a photograph of the user. In this manner, the service provider may confirm, for example, that the user is associated with the customer order prior to the information related to that order being presented to the user.

In certain embodiments, after the MPF system has identified one or more proximate potential payees and retrieved the relevant photographic, biographic, and/or other information for each of those proximate potential payees, the MPF system may in various circumstances cause a listing of such identified proximate potential payees to be displayed to the user (such as via display 155 of the user mobile device 150 depicted within FIG. 1). As noted elsewhere herein, such listing may be initiated by the MPF system based on one or more defined preferences of the user or other parameters. Also as noted in greater detail elsewhere herein, the MPF system may determine to present a listing of such identified proximate potential payees in various manners, such as in accordance with an association of such proximate potential payees to a merchant associated with an order of the user, a determination by the MPF system that a potential payee is appropriate for the user, etc.

In various embodiments, the MPF system may provide the user with one or more graphical or other controls for specifying aspects of a gratuity or other payment to be made to one or more identified proximate potential payees via the MPF system. For example, the MPF system may provide the user with controls for specifying a payment amount; a payment percentage (such as with reference to a merchant order of the customer); a payment account or mechanism (such as a banking routing number, account number, credit card number, or other payment mechanism). In addition, the MPF system may enable a user under certain circumstances to initiate payment to one or more identified proximate potential payees anonymously, such as to prevent information regarding the user to be presented to the payee. Furthermore, the MPF system may in various embodiments initiate payment to a selected potential payee via invoking one or more third-party applications on the user mobile device, such as to invoke one or more payment services associated with the user. As one example, the MPF system may allow the user to specify that one or more payments to a selected potential payee is to be made via invoking Apple Pay, Samsung Pay, Android Pay, or other payment service. In certain embodiments, payments initiated via the MPF system may be secured via one or more security mechanisms of the user mobile device, such as a fingerprint reader, iris scanner, password, or other mechanism.

In one or more scenarios and embodiments, such as when splitting payment for a customer order between multiple users or otherwise, the MPF system may enable a user to provide partial payment of a retrieved customer order. For example, the MPF system may allow the user to designate one or more identified potential payees as part of a larger group associated with the retrieved customer order. As described above, in certain embodiments the MPF system may provide one or more notifications to such designated potential payees, such as to request confirmation that they are associated with the retrieved customer order. In addition, the MPF system may enable each of the users designated as being associated with a retrieved customer order (or a service provider associated with the customer order) to indicate particular items within the retrieved customer order for which each user is responsible. In this manner, the MPF system may enable initiating payment for equal or distinct user-specified portions of a customer order by one or more users of the MPF system.

Various example graphical user interface ("GUI") screens generated by the MPF system will now be presented with respect to particular embodiments shown for illustrative purposes, although it will be appreciated that other embodiments may include more and/or less information, and that various types of illustrated information may be replaced with other information. In particular, FIGS. 2A-2F illustrate examples of providing and receiving various functionality with respect to identifying and facilitating payments and/or other transactions between service providers, merchants, and other potential payee users of the MPF system.

FIG. 2A illustrates a GUI 200a displaying an initial user screen associated with the MPF system, such as may be displayed (with reference to FIG. 1) by user mobile device 150. In certain scenarios and embodiments, the user mobile device may display GUI 200a as part of executing client MPF application 158 (such as while interacting with remote MPF system 110 or otherwise), or as part of interacting with the remote MPF system using a browser application (not shown) via Web server 118 and/or graphical user interface 122.

In the depicted embodiment, GUI 200a includes an MPF system logo 202, such as to identify an operator of the MPF system; a user identifier 204 ("Therman Wheeler" in the illustration of FIG. 2A); a user photographic portrait 206; a map display 208, which currently displays a location marker 209a (indicating the user's current geographical location) and proximity indicator 209b (indicating a circular region within which potential payees may be identified by the MPF system); operational controls 210 and 212 (respectively indicating "Check Please!" and "Tip!" in the depicted embodiment); and historical gratuity information 214, in this example indicating tracked values for the most recent gratuity provided by the user via the MPF system ($5.00) and a total amount of gratuities provided by the user via the MPF system during the current month ($42.61). The GUI 200a of the depicted embodiment further includes MPF system menu 216, such as to display navigational controls for additional operations of the MPF system (e.g., to define one or more user preferences or other operations); and message notification indicator 218, such as to indicate that the user has received an alert regarding an operation of the MPF system (e.g., to indicate a message received from another user, to indicate one or more gratuity operations have completed, or other type of notification). In the illustrated embodiment, operational control 210 may allow the user to directly view a pending order associated with the user and with an identified proximate merchant, while operational control 212 may allow the user to view (and select from) any identified potential payees within the proximity indicator 209b of the map display 208.

FIG. 2B illustrates a GUI 200b displaying a potential payee selection interface, such as may be displayed by a user mobile device upon identifying potential payees within a defined proximity of the user mobile device (e.g., located within the proximity indicator 209b of FIG. 2A) in response to a user selection of operational control 212 of GUI 200a depicted in FIG. 2A. Currently, the selection interface includes details regarding five potential payees identified by the MPF system. For each of the five identified potential payees included within payee selection regions 225a-e, the selection interface presents a potential payee photographic representation or portrait 220a-e; a payee identifier 222a-e; and biographical summary information 224a-e. In the depicted embodiment, the biographical information 224a-e for each of four of the identified potential payees includes an indication of a merchant associated with the potential payee. In particular, "Lauren V." is identified as "Works at Applebee's" 224a; "James K." is identified as "Works at Chick-fil-a" 224b; Jesse V." is identified as "Valet at Marriott Midtown" 224c; and "Aidan C." is identified as "Works at Applebee's" 224e. The fifth identified potential payee, "James P.," is not associated with any identified merchant in the depicted embodiment 222d, but may still be selected by the user and 22 paid a gratuity via the MPF system. The GUI 200b further includes navigational controls 226a (such as to allow the user to return to a previous interface screen of the MPF system) and 226b (such as to enable the user to close the current displayed GUI).

Figure 2D:
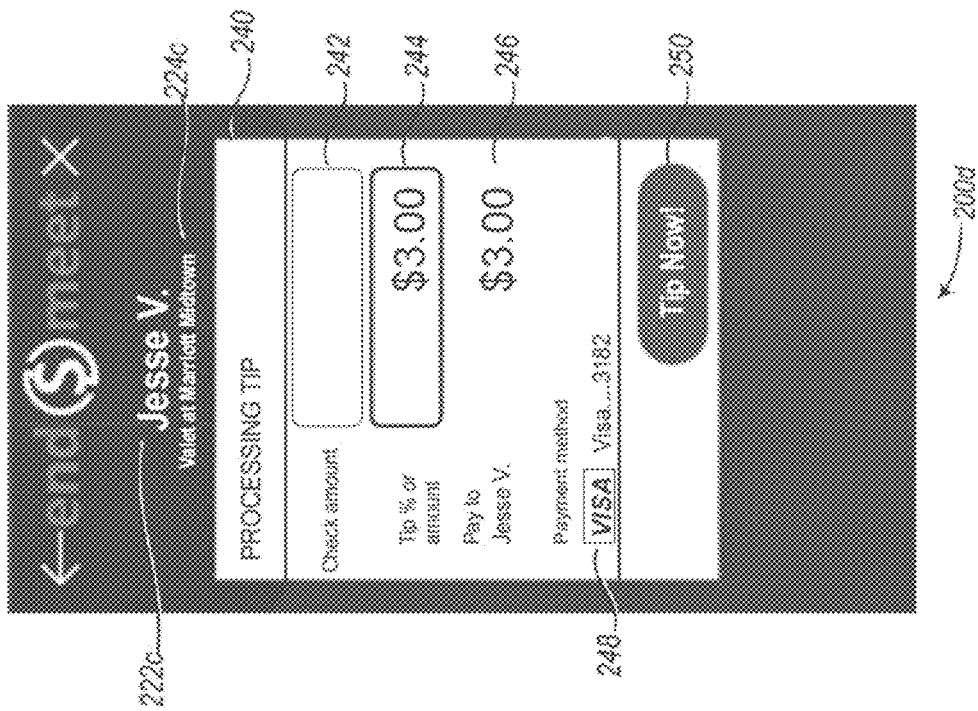
Figure 2C:
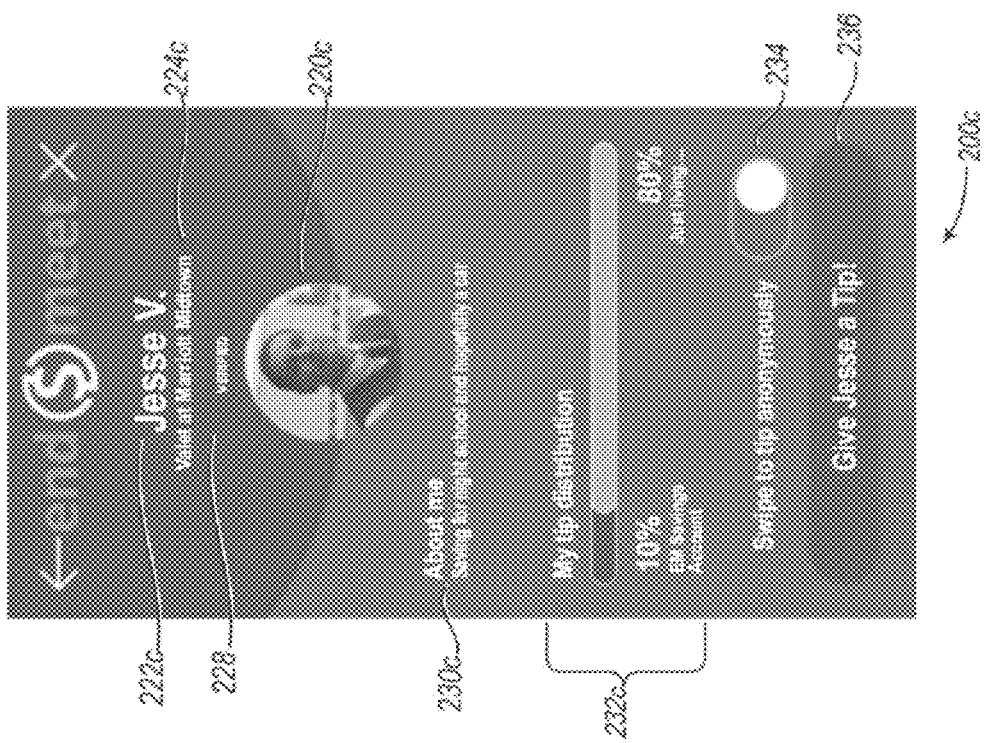

FIG. 2C illustrates a GUI 200c displaying a potential payee detail interface corresponding to one of the identified potential payees, such as if the user selected payee selection region 225c within the GUI 200b of FIG. 2B. In particular, the potential payee detail interface of the illustrated embodiment includes details presented in the earlier potential payee selection interface of GUI 200b, including payee identifier 222c ("Jesse V."), biographical summary information 224c ("Valet at Marriott Midtown"), and photographic portrait 220c. The potential payee detail interface further includes payment verification indicator 228, indicating that one or more payment methods associated with the potential payee has been verified by the MPF system; additional biographic information 230c; gratuity distribution information 232c, indicating that 10% of payments provided to Jesse V. via the MPF system will be credited to an "EM Savings Account"; anonymity selection control 234, allowing the user to select whether to provide payment to the potential payee without revealing an identity of the user; and gratuity operational control 236, allowing the user to specify details regarding a gratuity to be made to the potential payee via the MPF system.

FIG. 2D illustrates a GUI 200d displaying a gratuity detail interface, such as if the user selected gratuity operational control 236 within the GUI 200c of FIG. 2C. In particular, in the depicted embodiment the gratuity detail interface again displays the payee identifier 222c and biographical summary information 224c for "Jesse V.", and further displays the gratuity specification dialog 240. In the illustrated embodiment, the gratuity specification dialog includes user-fillable monetary controls 242 and 244, which respectively allow the user to specify a monetary amount associated with an underlying order and to specify an amount or percentage for the gratuity to be paid via the MPF system; a gratuity amount indicator 246, which in the illustrated embodiment is calculated and displayed by the MPF system based on user input to monetary controls 242 and 244; payment mechanism indicator 248, indicating a payment method to be used for payment of the indicated gratuity; and gratuity initiation control 250, allowing the user to request that the MPF system initiate payment to the indicated payee using the displayed information and payment method. In the depicted embodiment of FIG. 2D, although "Jesse V." has been identified as a "Valet at Marriott Midtown," the user has only specified to initiate a gratuity to the payee individually rather than in conjunction with paying in order associated with the Marriott Midtown merchant. For a contrasting example in which the user elects to initiate a gratuity in conjunction with payment of a merchant order, see FIGS. 2E-F below.

Figure 2F:
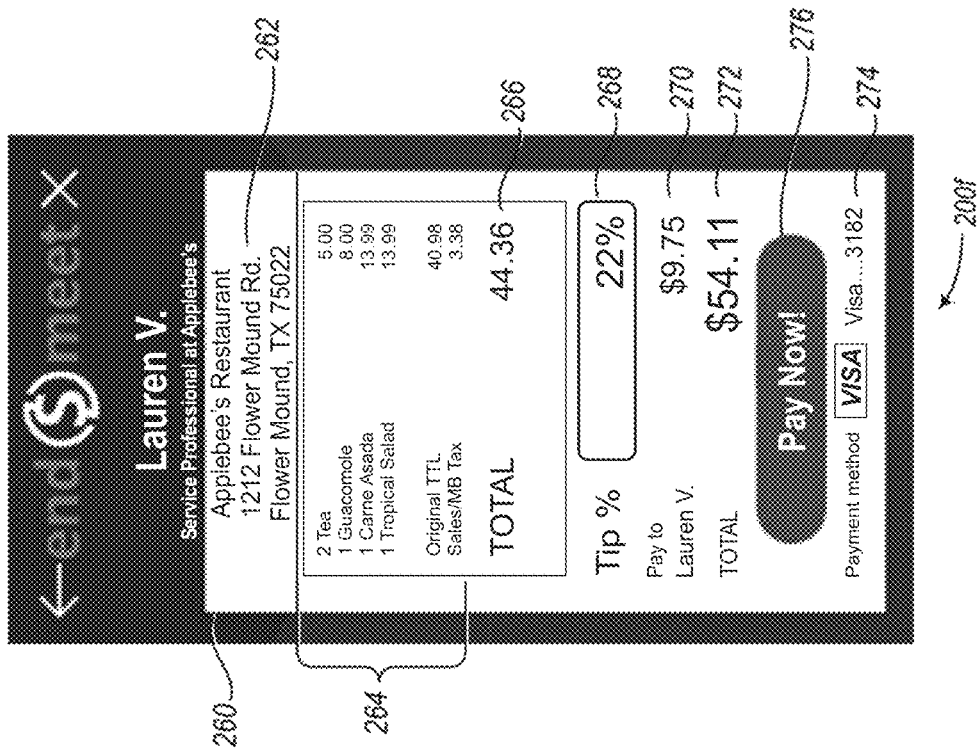
Figure 2E:
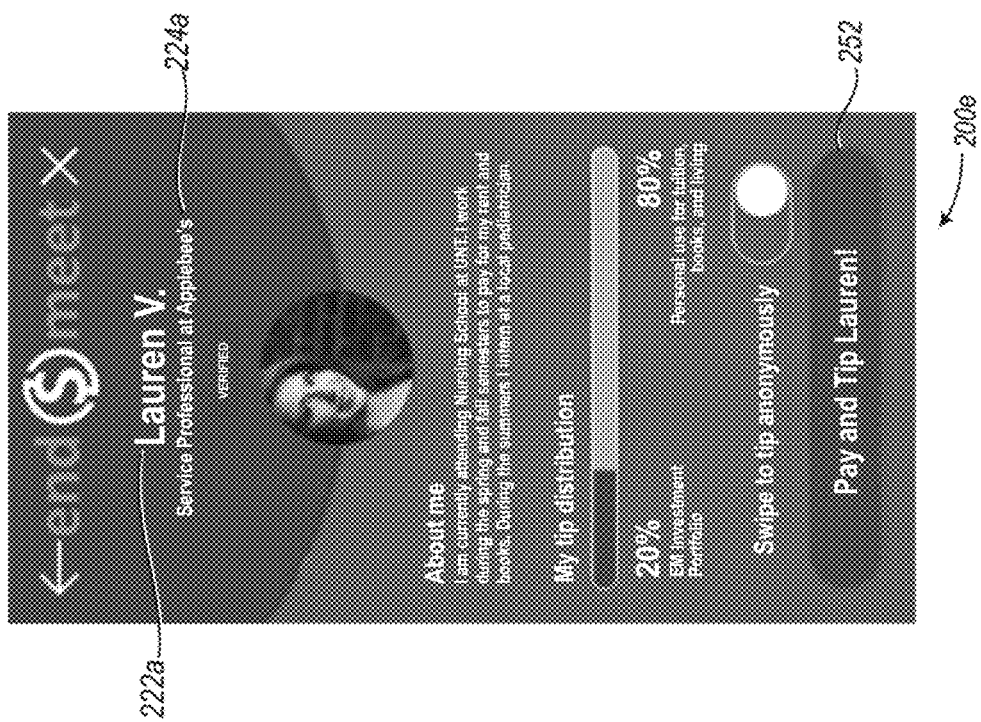

FIG. 2E illustrates a GUI 200e displaying a potential payee detail interface corresponding to another one of the potential payees identified within the GUI 200b of FIG. 2B, such as if the user selected payee selection region 225a. In particular, the payee identifier 222a and biographical summary information 224a indicate that "Lauren V." is a "Service Professional at Applebee's." Furthermore, and in contrast with gratuity operational control 236 depicted in FIG. 2C, the GUI 200e includes payment operational control 252 ("Pay and Tip Lauren!"), allowing the user to request information regarding an associated order with the merchant associated with Lauren (in this case, "Applebee's") in order to provide both payment for some or all of that associated order and a gratuity to Lauren individually.

FIG. 2F illustrates a GUI 200f displaying an order detail 260, such as if the user selected payment operational control 252 of GUI 200e within FIG. 2E. The order detail includes merchant identifying information 262; itemized listing 264, detailing the items associated with the user's current order as reported by a point-of-sale terminal of the identified merchant; order subtotal 266; user-selectable gratuity indicator 268, which currently displays the intended gratuity as a percentage of the order subtotal, but may alternatively be entered by the user as a monetary amount; gratuity amount indicator 270; order total 272, which in the illustrated embodiment is based on the order subtotal and gratuity percentage; payment mechanism indicator 274; and payment initiation control 276, allowing the user to request that the MPF system initiate monetary payments to both the indicated merchant (in the amount indicated via order subtotal 266) and to Lauren V. (in the amount indicated via gratuity amount indicator 270).

It will be appreciated that the GUIs, display screens and other information presented with respect to FIGS. 2A-2F are included for illustrative purposes, and that such information and/or other information and associated functionality may be presented or otherwise provided in other manners in other embodiments.

As non-limiting examples, one or more of GUI 200a-f may in certain embodiments further include user interface elements intended to invoke additional operations of the MPF system, such as to identify and/or select additional users with whom to split (i.e., provide partial payments for) a merchant order associated with such users; to provide communications between multiple users of the MPF system (e.g., information from a service provider regarding special offers from an associated merchant to users of the MPF system that have previously provided the service provider with one or more gratuities, messages between service providers associated with a single merchant, or other information); to define one or more user preferences; to provide additional user profile information to the MPF system (e.g., payment methods, contact information); etc.

In addition, it will be appreciated that GUIs and other information presented to users may vary with the type of client device used by the user, such as to present less information and/or functionality via client devices with smaller display screens and/or less ability to present information to or obtain input from the user, such as under control of a mobile application of the MPF system interface executing on the client device, or otherwise based on information sent to the client device 150 from the MPF system 110.

Figure 3:
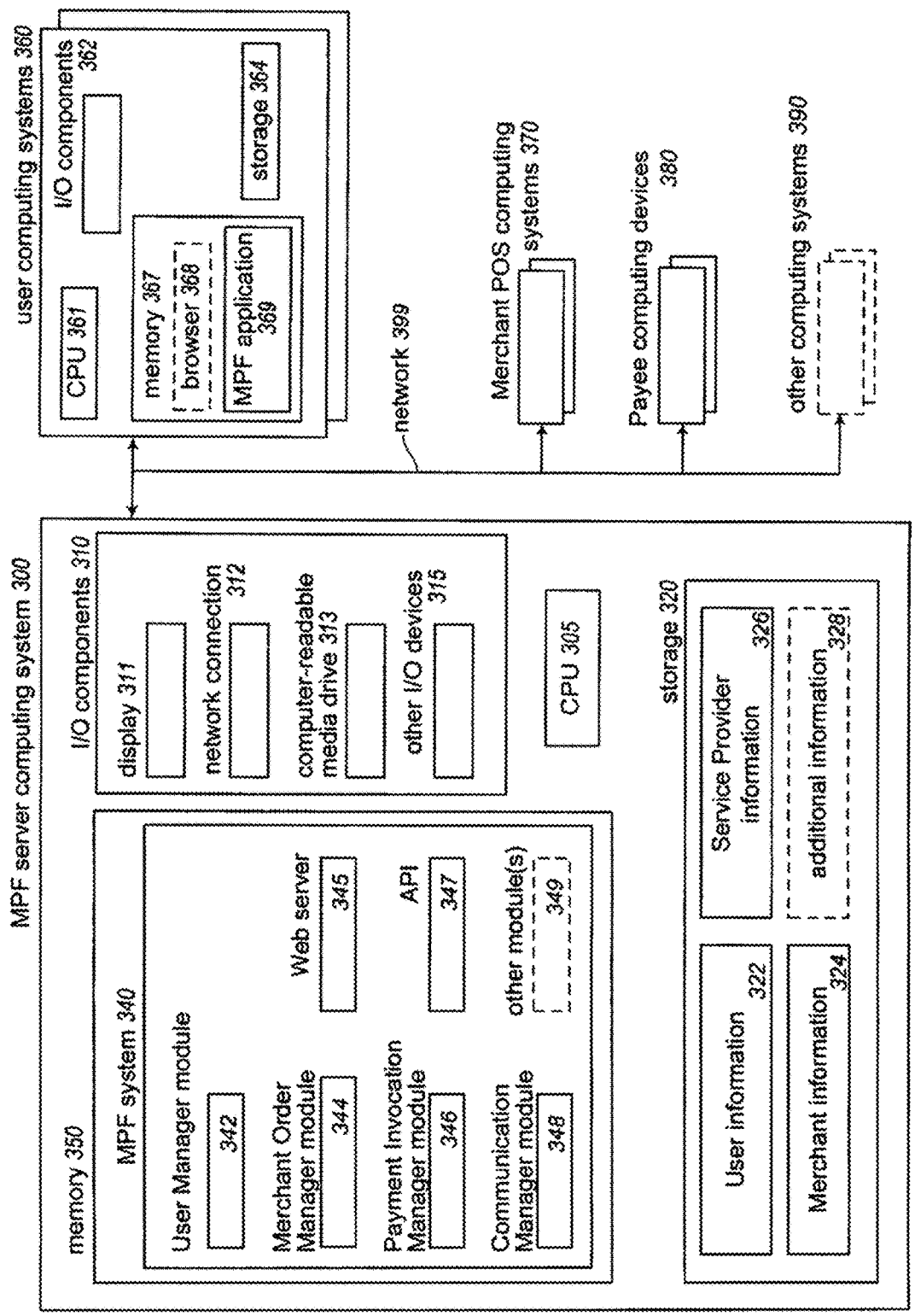
FIG. 3 is a block diagram illustrating component-level functionality provided by a plurality of electronic circuits that, when in combined operation, are suitable for performing and configured to perform at least some of the techniques described in the present disclosure.

FIG. 3 is a block diagram illustrating component-level functionality provided by a plurality of electronic circuits that, when in combined operation, are suitable for performing and configured to perform at least some of the techniques described herein. In the particular implementation depicted, the plurality of electronic circuits is at least partially housed within a processor-based server computing system 300 executing an implementation of a MPF system 340. The server computing system 300 includes one or more central processing units ("CPU") or other processors 305, various input/output ("I/O") components 310, storage 320, and memory 350, with the illustrated I/O components including a display 311, a network connection 312, a computer-readable media drive 313, and other I/O devices 315 (e.g., keyboards, mice or other pointing devices, microphones, speakers, GPS receivers, etc.). The server computing system 300 and MPF system 340 may communicate with other computing systems via one or more networks 399 (e.g., the Internet, one or more cellular telephone networks, etc.), such as MPF user computing systems 360, merchant point-of-sale computing systems 370, payee computing systems 380, and other computing systems 390.

In the illustrated embodiment, an embodiment of the MPF system 340 executes in memory 350 in order to perform at least some of the described techniques, such as by using the processor(s) 305 to execute software instructions of the system 340 in a manner that configures the processor(s) 305 and computing system 300 to perform automated operations that implement those described techniques via user manager module 342 (which is functionally similar to user manager 112 of FIG. 1), merchant order manager module 344 (functionally similar to merchant order manager 114 of FIG. 1), payment invocation manager module 346 (functionally similar to payment invocation manager 116 of FIG. 1), communication manager module 348, Web server 345 (functionally similar to Web server 118 of FIG. 1), API 347 (functionally similar to API 120 of FIG. 1), and (optionally) other programs and modules 349. As part of such automated operations, the MPF system 340, modules thereof, and/or other optional programs or modules 349 executing in memory 330 may store and/or retrieve various types of data, including in the example database data structures of storage 320. In this example, the data used may include various types of user information in database ("DB") 322, various types of merchant information in DB 324, various types of service provider information in DB 326, and/or various types of additional information 328, such as various information related to payment history or tracking information related to previous transactions and interactions with the MPF system.

Some or all of the user computing systems 360, merchant point-of-sale computing systems 370, payee computing systems 380, and other computing systems 390 may similarly include some or all of the types of components illustrated for server computing system 300. As a non-limiting example, the MPF user computing systems 360 include CPU 361, I/O components 362, storage 364, and memory 367. In the depicted embodiment, a browser 368 and MPF client application 369 are executing within memory 367, such as to perform various interactions with the MPF server computing system 300 or others.

It will be appreciated that computing system 300 other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated MPF system 340 may in some embodiments be distributed in various modules other than those specifically illustrated. Similarly, in some embodiments, some of the functionality of the MPF system 340 may not be provided and/or other additional functionality may be available. In addition, in certain implementations various functionality of the MPF system may be provided by third-party partners of an operator of the MPF system. For example, data collected by the MPF system may be provided to a third party for analysis and/or metric generation.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the MPF system 340 and/or MPF client software executing on user computing systems 360, merchant point-of-sale computing systems 370, and/or payee computing devices 380) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
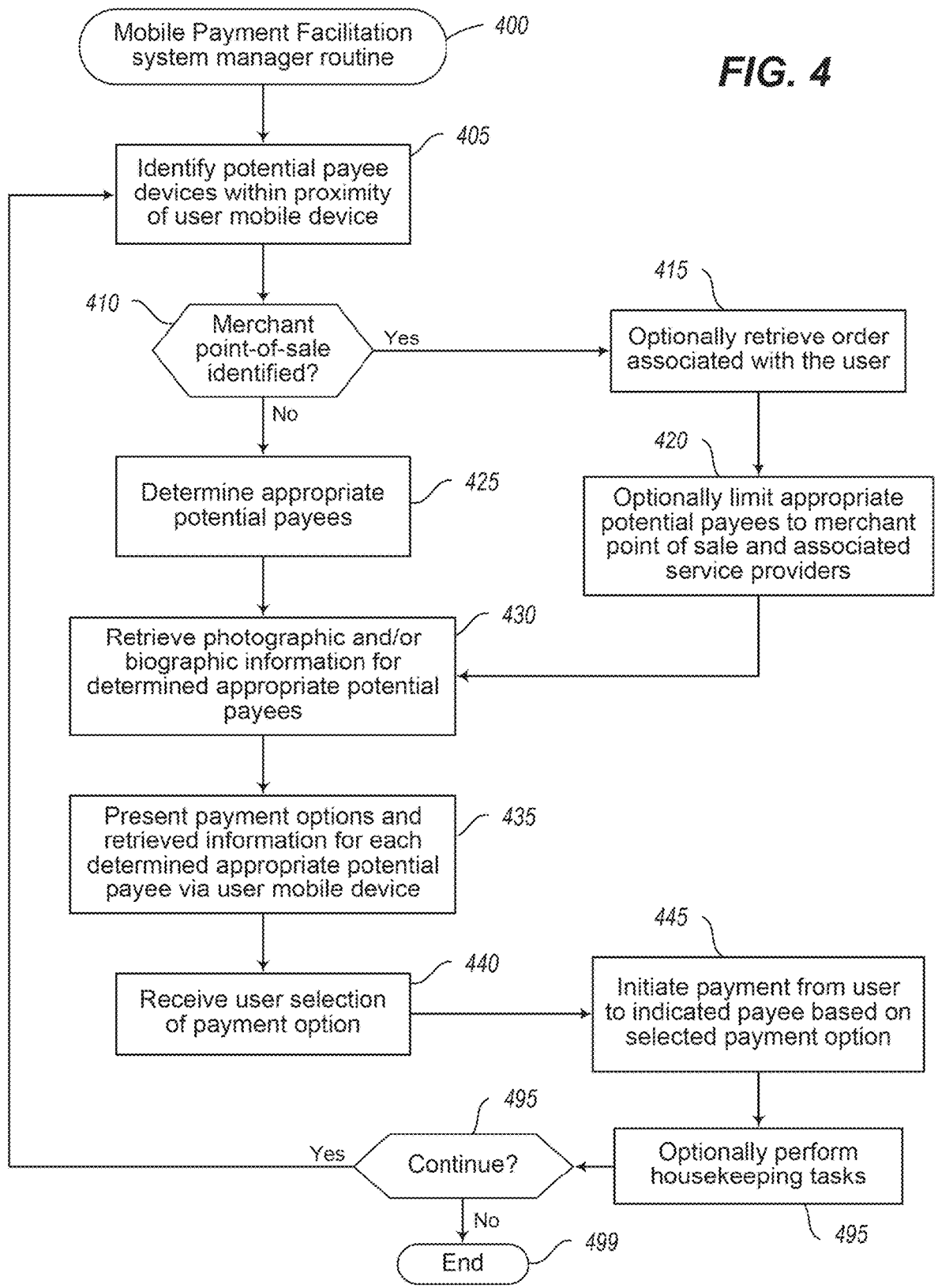
FIG. 4 is a flow diagram that depicts a process flow for a Mobile Payment Facilitation manager routine in accordance with an embodiment of the present disclosure.

FIG. 4 depicts an exemplary method of operation 400 of a MPF system in accordance with various embodiments of techniques described herein, such as may be performed by (with reference to FIG. 1) the MPF application 158, by one or more modules of the MPF system 110, and/or (with reference to FIG. 3) the MPF system 340 executed by the server computing system 300.

The system manager routine of FIG. 4 begins at 405, in which a processor-based device identifies potential payee devices within a proximity of a mobile device associated with a user. As described elsewhere herein, such identification may be based on one or more wireless connections of the user mobile device.

At 410, a processor-based device determines whether a merchant point-of-sale terminal is included in the potential payee devices identified in 405 as being within a proximity of the user mobile device. If so, the routine proceeds to 415, in which a processor-based device optionally retrieves an order with the merchant that is associated with the user of the mobile device, and then to 420, in which a processor-based device optionally constrains appropriate identified potential payees to service providers that are associated with the merchant point-of-sale terminal.

If in 410 it was determined that no merchant point-of-sale terminal was included in the potential payee devices identified in 405 as being within a proximity of the user mobile device, the routine proceeds to 425, in which a processor-based device determines some or all of the identified potential payees are an appropriate subset of potential payees with respect to the user of the mobile device. As described in greater detail elsewhere herein, the appropriateness of identified potential payees may be determined in accordance with user preferences, based on aspects of the identified potential payee, based on aspects of the user, or other various criteria.

After 420 or 425, the routine proceeds to 430, in which a processor-based device retrieves photographic and/or biographic information for appropriate potential payees associated with devices identified as being proximate to the user mobile device. At 435, a processor-based device causes the user mobile device to present payment options and the retrieved corresponding photographic and/or biographic information for each of the determined appropriate potential payees to the user.

At 440, a processor-based device receives an indication that the user has selected one or more of the presented payment options. As described in greater detail elsewhere herein, such selection may indicate particular potential payees, and may additionally include input from the user regarding a monetary amount, a payment mechanism (e.g., an account, credit card, third-party application, or other mechanism via which to provide the indicated payment), anonymity preference, etc.

At 445, based on the indicated user selection, a processor-based device initiates payment from the user of the mobile device to the selected payees, causing a corresponding crediting of one or more accounts associated with each of the selected one or more potential payees. As described elsewhere herein, such payment may include crediting accounts for each of the selected payees in accordance with their respective defined preferences, such as to split the payment between a savings account designated for a particular purpose and a checking account, or other manner.

After 445, control passes to 495 to optionally perform any other actions as appropriate, such as any housekeeping tasks. Non-limiting examples of such housekeeping tasks may include generation of tracking data related to any initiated payments; storing and/or optimizing historical information for the MPF system; etc. In 495, a processor-based device determines whether to continue, such as in response to an explicit indication to terminate. If it is to continue, control returns to 405 to identify potential payee devices (such as to update a listing of such devices currently within a proximity to the user mobile device), and if not proceeds to 499 and ends.

Figure 5:
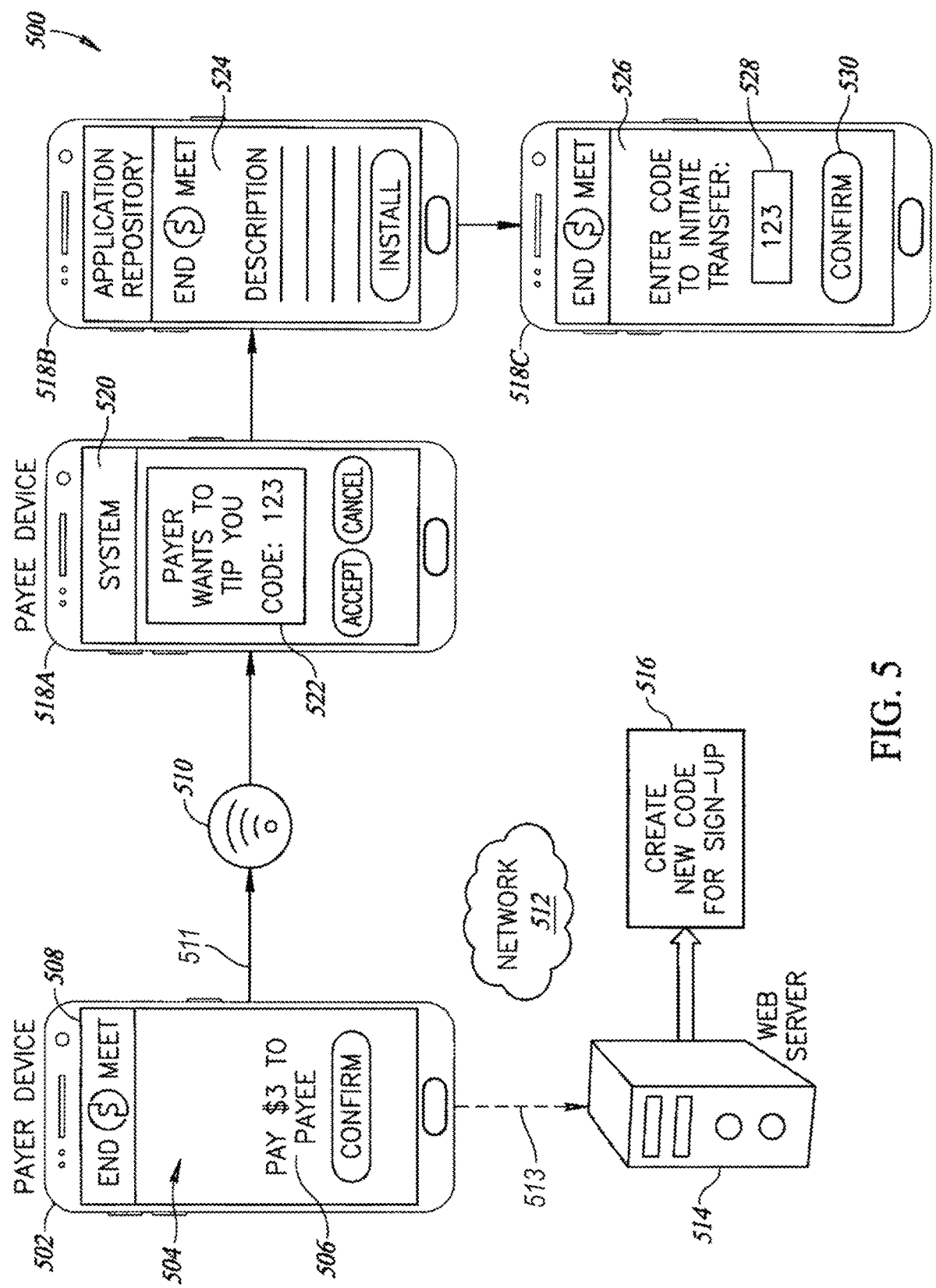
FIG. 5 is a schematic diagram that illustrates a networked environment in which payment to a payee is facilitated in accordance with an embodiment of the present disclosure.

FIG. 5 shows an exemplary networked environment 500 including a plurality of computing systems in accordance with an embodiment of the present disclosure. In the environment 500, a user (payor) operating a payor device 502 may interact with a MPF application 504 to transfer payment to a payee who is not registered to receive payment via the MPF application 504. The payor device 502 corresponds to the mobile devices (e.g., 150, 160) described herein and includes memory storing a set of instructions for implementing the MPF application 504 that, as a result of execution by one or more processors of the payor device 502, causes the payor device 502 to perform one or more operations described herein. The MPF application 504 includes a graphical user interface 506 presented on a display 508 (e.g., touchscreen display) of the payor device 502 that facilitates transferring and receiving payment to and from others. In some situations, a person to whom the payor desires to transfer payment may not be registered to receive payment via the MPF application 504 because, for example, they have not installed the MPF application 504 on their mobile device or do not have a user account registered with the MPF system.

A payor, via the MPF application 504 on the payor device 502, may initiate the transfer of payment to a payor device 518A that does not have the MPF application installed thereon. As a result of the initiation of payment transfer, the MPF application 504 causes the payor device 502 to send a communication 511 to the payee device 518A over an ad hoc connection 510. The ad hoc connection 510 is a direct wireless network connection established between the payor device 502 and the payee device 518A without intervening network infrastructure, such as a wireless router or cellular telephony network, and may use Near Field Communication protocols and devices. Examples of the ad hoc connection 510 include AirDrop by Apple®, Android Beam by Google®, AirDroid, and Files Go by Google®, by way of non-limiting example. In connection with the communication 511, the payor device 502 may communicate with a Web Server 514 of the MPF system 110 over a network 512 to facilitate the payment transfer to the payee device 518A. The network 512 corresponds to the network 101 described herein, and may include public and/or private networks comprising the internet. In response to receiving a communication 513 from the payor device 502 regarding the payment transfer to the payee device 518A, the Web Server 514 performs a process 516 for facilitating the payment transfer. In some implementations, the payor device 502 sends the communication 513 to the Web Server 514 regarding the payment transfer in response to a communication from the payee device 518A indicating that the payee device 518A does not have the MPF application installed thereon. In some implementations, the payor device 502 sends the communication 513 to the Web Server 514 regarding the payment transfer before sending the communication 511 to the payee device 518A over the ad hoc connection 510.

The communication 513 may include various information regarding the payment transfer, such as an amount to be transferred, information associated with the payor (e.g., account identification, authentication information), and information associated with the payee (e.g., mobile device number, payee identifier). The process 516 performed by the Web Server 514 includes generating reference information useable to allow the payee to receive the payment. The reference information may be an alphanumeric code or a digitally signed token that can be used to allow the payee to retrieve the payment through the MPF application after being installed on the payee device 518A. The process 516 performed by the Web Server 514 may include holding the payment in abeyance until such time that payment can be effectuated via the MPF application upon being installed on the payee device 518A. For example, the Web Server 514 may cause the reference information to be associated with information provided in the communication 513 regarding the payment, such as account information of the payor and the amount of the payment. The Web Server 514 may provide the reference information to the payee device 518A and/or the payor device 502.

The reference information is provided to the payee device 518A to allow the payee to receive the payment via the MPF application once installed. The payee device 518A receives a communication containing information useable to access and install the MPF application on the payee device 518 from an application repository. For example, the communication 511 may include an address, link, or other reference to a source from which a set of instructions corresponding to the MPF application may be obtained. The communication 511 may cause a prompt 522 to be displayed on the display of the payee device 518A via the operating system 520 or subsystem thereof presenting the payee with an option for retrieving the MPF application to accept (or decline) payment. The reference information may be included in the communication 511 or a subsequent communication via the ad hoc communication 510 to allow the payee to later receive the payment via the MPF application.

Via payee interaction with the prompt 522, the payee device 518B may access a source 524 for obtaining the MPF application. For instance, the payee may select a link or button on the display of the payee device 518B to access the source 524. The source 524 may be a remote application repository (e.g., Apple® App Store, Google® Play) from which the set of instructions for implementing the MPF application may be downloaded via the network 512. The payee downloads and installs the MPF application on the payee device 518B. Then, the MPF application can be accessed on the payee device 518C.

After opening the MPF application, the payee can interact with a user interface 526 of the MPF application to transfer funds to fulfill the payment initiated by the payor. The payee may create a user account and provide financial account information corresponding to a destination to which the funds may be transferred. In some implementations, the user interface 526 may include an input field 528 into which the the alphanumeric code provided in connection with the payment may be entered. In some implementations, the user interface 526 may include an input element for selecting the token or other data object provided to the payee device 518A in connection with the payment. The payee may then select an input element 530 to confirm or accept the payment associated with the alphanumeric code or token. Selection of the input element 530 causes the payee device 518C to send the alphanumeric code or token to the Web Server 514 to transfer the funds. The Web Server 514 may process the alphanumeric code or token and retrieve the payment information, if any, corresponding to the alphanumeric code or token. Thereafter, the Web Server 514 may cause execution of the payment of funds from an account of the payor to an account of the payee.

As a result of the features of the MPF system described with respect to FIG. 5, a payor can transfer funds to a payee who does not have the MPF application installed on his or her mobile device. Moreover, the payee and payor do not have to be in the same area when the payment is executed. The payee can download the MPF application and execute the payment in a secure manner at a later time and at a different location without further interaction with the payor.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method, comprising:

autonomously identifying, by one or more processors of a payments system server, each of one or more mobile devices in a proximity of a first mobile device that is logically associated with a potential payor of a gratuity;

comparing, by the one or more processors of the payments system server, each potential payee associated with each of the one or more mobile devices with information associated with the potential payor;

determining, by the one or more processors of the payments system server, that at least one of the potential payees is an appropriate potential payee based on a determination that the at least one of the potential payees is associated with a merchant in a proximity of the first mobile device;

communicating, by the one or more processors of the payments system server, a notification to the first mobile device that at least one appropriate potential payee has been identified;

causing, by the one or more processors of the payments system server, for each appropriate potential payee and not for any potential payee that is not determined to be an appropriate potential payee, a presentation of a photographic representation of at least a face and biographical data of the appropriate potential payee of the gratuity comprising a service performing employee or unemployed service performer and a service performing employee status or unemployed service performer status of the respective appropriate potential payee of the gratuity that is logically associated with the respective identified mobile device, the presentation via a display of the first mobile device that is logically associated with the potential payor of the gratuity; and causing, by the one or more processors of the payments system server, in response to an input received via a user interface of the first mobile device, a crediting of an account associated with a selected one of the appropriate potential payees of the gratuity, wherein the crediting of the account is performed anonymously such that information associated with the payor is not presented to the selected one of the appropriate potential payees.

2. The computer-implemented method of claim 1 wherein causing the crediting of the account associated with the selected one appropriate potential payee includes causing a crediting of multiple accounts associated with the selected one appropriate potential payee in accordance with defined preferences of the selected one potential payee.

3. The computer-implemented method of claim 1 further comprising receiving information from the potential payor specifying a payment amount for the crediting of the account associated with the selected one appropriate potential payee.

4. The computer-implemented method of claim 1 wherein causing the crediting of the account associated with the selected one appropriate potential payee includes causing a corresponding debiting of an account associated with the potential payor.

5. The computer-implemented method of claim 1 further comprising identifying a point-of-sale terminal associated with a merchant that is within the proximity of the first mobile device, and providing an indication to the potential payor via the first mobile device of an order of the potential payor that is associated with the merchant, wherein causing a crediting of an account associated with the selected one of the appropriate potential payees includes causing a crediting of an account associated with the merchant for at least a portion of the associated order.

6. The computer-implemented method of claim 1 wherein causing the presentation of the photographic representation of the respective potential payee logically associated with one of the identified mobile devices includes causing the one identified mobile device to further display biographic information associated with the respective appropriate potential payee.

7. The computer-implemented method of claim 6 wherein the biographic information associated with the respective potential payee has been supplied by the respective appropriate potential payee.

8. The computer-implemented method of claim 1 wherein the respective appropriate potential payee logically associated with one of the identified mobile devices is a service provider associated with one or more services for the potential payor.

9. The computer-implemented method of claim 1, wherein the information associated with the potential payor is based on user preferences of the potential payor.

10. The computer-implemented method of claim 1, wherein the information associated with the potential payor is based on user history of the potential payees.

11. The computer-implemented method of claim 1, wherein the information associated with the potential payor is based on previous payment data of the potential payor.

* * * * *